(12) United States Patent
Switzer et al.

(10) Patent No.: US 10,458,220 B2
(45) Date of Patent: Oct. 29, 2019

(54) SYSTEM AND METHOD FOR FACILITATING SUBTERRANEAN HYDROCARBON EXTRACTION UTILIZING ELECTROCHEMICAL REACTIONS WITH METALS

(71) Applicants: Elise Switzer, Napa, CA (US); Cody Friesen, Fort McDowell, AZ (US); Heath Lorzel, Mesa, AZ (US)

(72) Inventors: Elise Switzer, Napa, CA (US); Cody Friesen, Fort McDowell, AZ (US); Heath Lorzel, Mesa, AZ (US)

(73) Assignee: ARIZONA BOARD OF REGENTS ON BEHALF OF ARIZONA STATE UNIVERISTY, Scottsdale, AZ (US)

( * ) Notice: Subject to any disclaimer, the term of this patent is extended or adjusted under 35 U.S.C. 154(b) by 0 days.

(21) Appl. No.: 15/508,776

(22) PCT Filed: Sep. 4, 2015

(86) PCT No.: PCT/US2015/048615
§ 371 (c)(1),
(2) Date: Mar. 3, 2017

(87) PCT Pub. No.: WO2016/037094
PCT Pub. Date: Mar. 10, 2016

(65) Prior Publication Data
US 2017/0284180 A1   Oct. 5, 2017

Related U.S. Application Data
(60) Provisional application No. 62/046,280, filed on Sep. 5, 2014.

(51) Int. Cl.
*E21B 43/267* (2006.01)
*E21B 43/26* (2006.01)
(Continued)

(52) U.S. Cl.
CPC .......... *E21B 43/26* (2013.01); *C09K 8/70* (2013.01); *C09K 8/80* (2013.01); *E21B 43/267* (2013.01)

(58) Field of Classification Search
CPC .... E21B 43/26; E21B 43/267; E21B 43/2401; E21B 43/2405
See application file for complete search history.

(56) References Cited

U.S. PATENT DOCUMENTS 1,784,214 A   12/1930   Workman ............... 166/248
2,799,641 A   7/1957    Bell ........................ 166/248
(Continued)

FOREIGN PATENT DOCUMENTS

EP    2 212 516         12/1916
WO    2011/044612 A1    4/2011
(Continued)

OTHER PUBLICATIONS

Petrovic; "Reaction of Aluminum with Water to Produce Hydrogen: A Study of Issues Related to the Use of Aluminum for On-Board Vehicular Hydrogen Storage," U.S. Department of Energy, 2008, 1-26.
(Continued)

*Primary Examiner* — Zakiya W Bates
(74) *Attorney, Agent, or Firm* — Norton Rose Fulbright US LLP

(57) ABSTRACT

Methods and systems for facilitating extraction of subterranean hydrocarbons from a geologic structure. The present methods include causing corrosion of a base metal within a geologic structure to produce a gaseous product to increase pressure and form fractures in the geologic structure. Some embodiments of the present methods include injecting a fluid composition comprising the base metal into a wellbore (e.g., into a geologic structure via the wellbore).

17 Claims, 4 Drawing Sheets

(51) Int. Cl.
*C09K 8/70* (2006.01)
*C09K 8/80* (2006.01)

(56) References Cited

U.S. PATENT DOCUMENTS

| | | | |
|---|---|---|---|
| 3,141,504 A | 7/1964 | Sarapuu | 166/248 |
| 3,211,220 A | 10/1965 | Sarapuu | 166/248 |
| 3,916,993 A | 11/1975 | Katz | 166/248 |
| 4,037,655 A | 7/1977 | Carpenter | |
| 4,084,638 A | 4/1978 | Whiting | |
| 4,199,025 A | 4/1980 | Carpenter | |
| 4,463,805 A | 8/1984 | Bingham | |
| 4,473,114 A | 9/1984 | Bell et al. | 166/248 |
| 4,553,592 A | 11/1985 | Looney et al. | |
| 4,567,945 A | 2/1986 | Segalman | |
| 4,662,438 A | 5/1987 | Taflove et al. | 166/245 |
| 5,438,169 A | 8/1995 | Kennedy et al. | |
| 6,148,911 A | 11/2000 | Gipson et al. | 166/248 |
| 6,705,425 B2 | 3/2004 | West | 181/106 |
| 6,877,556 B2 | 4/2005 | Wittle et al. | |
| 7,134,492 B2 | 11/2006 | Willberg et al. | |
| 7,325,604 B2 | 2/2008 | Wittle et al. | 166/248 |
| 7,631,691 B2 | 12/2009 | Symington et al. | 166/248 |
| 8,157,981 B2 | 4/2012 | Peters et al. | 205/687 |
| 2002/0121370 A1 | 9/2002 | Kurkjian et al. | |
| 2002/0141288 A1 | 10/2002 | West | |
| 2003/0205083 A1 | 11/2003 | Tubel et al. | |
| 2004/0168811 A1 | 9/2004 | Shaw et al. | |
| 2005/0199387 A1 | 9/2005 | Wittle et al. | |
| 2006/0118305 A1 | 6/2006 | East, Jr. et al. | |
| 2007/0131422 A1 | 6/2007 | Gatlin et al. | |
| 2008/0183451 A1 | 7/2008 | Weng et al. | |
| 2008/0230219 A1 | 9/2008 | Kaminsky | 166/248 |
| 2011/0192593 A1 | 8/2011 | Roddy et al. | |
| 2011/0203797 A1 | 8/2011 | Alexandrov et al. | |
| 2011/0240287 A1 | 10/2011 | Hartshorne et al. | |
| 2011/0277992 A1 | 11/2011 | Grimes | |
| 2011/0278012 A1 | 11/2011 | Marino et al. | |
| 2012/0273190 A1 | 11/2012 | Thomas et al. | 166/248 |
| 2012/0279713 A1 | 11/2012 | Leon et al. | 166/303 |
| 2012/0298527 A1 | 11/2012 | James et al. | |
| 2013/0026978 A1 | 1/2013 | Cooley et al. | |
| 2013/0105174 A1 | 5/2013 | Noui-Mehidi | |
| 2013/0206400 A1 | 8/2013 | Alexandrov et al. | |
| 2013/0312957 A1 | 11/2013 | Grimes | 166/248 |
| 2014/0262249 A1 | 9/2014 | Willberg et al. | |
| 2014/0284063 A1 | 9/2014 | Fripp et al. | |
| 2016/0040519 A1 | 2/2016 | Friesen et al. | |
| 2016/0333254 A1 | 11/2016 | Friesen et al. | |

FOREIGN PATENT DOCUMENTS

| | | |
|---|---|---|
| WO | WO 2012/025150 | 3/2012 |
| WO | 2013/055851 A2 | 4/2013 |
| WO | WO 2014/060949 | 4/2014 |
| WO | 2014/159676 A1 | 10/2014 |
| WO | 2015/105746 A1 | 7/2015 |
| WO | WO 2016/037094 | 3/2016 |

OTHER PUBLICATIONS

International Search Report and Written Opinion for PCT/US14/24699, dated Jul. 18, 2014.
International Search Report and Written Opinion for PCT/US2015/010116 dated Apr. 23, 2015.
International Search Report and Written Opinion for PCT/US2015/048615 dated Nov. 26, 2015.
International Search Report and Written Opinion issued in International Patent Application No. PCT/US2016/019040, dated Apr. 25, 2016.

SYSTEM AND METHOD FOR FACILITATING SUBTERRANEAN HYDROCARBON EXTRACTION UTILIZING ELECTROCHEMICAL REACTIONS WITH METALS

CROSS REFERENCE TO RELATED APPLICATION

This application is a national phase application under 35 U.S.C. § 371 of International Patent Application No. PCT/US2015/048615, filed Sep. 4, 2015, which claims the benefit of U.S. Provisional Application No. 62/046,280, filed Sep. 5, 2014, the contents of which applications are incorporated by reference.

FIELD OF INVENTION

The present invention is generally related to extraction of subterranean hydrocarbons; and more particularly, but not by way of limitation, to electrochemical reactions with metals to facilitate hydrocarbon extraction and fracturing of subterranean formations comprising hydrocarbons.

BACKGROUND

Hydrocarbons (e.g. petroleum, natural gas) are one of the principal energy sources utilized by current civilizations. Extraction of subterranean hydrocarbons is achieved through two principal types of processes: primary recovery and supplementary (e.g. secondary, tertiary) recovery. Primary recovery refers to hydrocarbon extraction through the natural energy prevailing in a wellbore. Supplementary recovery refers to hydrocarbon extraction through the addition of various forms of energy into a wellbore. Historically, primary recovery methods were economically satisfactory and thus hydrocarbon extraction was generally facile. As a result of worldwide oil field maturation and increasing demand, the development of supplementary recovery methods has become increasingly important. In recent years, supplementary recovery of natural gas from shale formations has increased due to advances in wellbore engineering. For example, horizontal drilling technology has significantly advanced, allowing the horizontal drilling of distances greater than a mile. In addition, advanced fracturing techniques in horizontally-drilled wellbores have greatly increased natural gas production from shale formations.

Induced fracturing of geologic structures comprising subterranean hydrocarbons is conventionally performed via hydraulic fracturing. Hydraulic fracturing propagates fractures within hydrocarbon-trapping formations by a pressurized fluid generated via compressors, thus creating conduits through which natural gas and petroleum may flow to the surface. The hydraulic fracturing process is expensive energetically and may be a generally inefficient method for fracturing the resource. Typically, hydraulic fracturing methods are logistically demanding and complicated, for example, requiring a multitude of pressure generators and fluid delivery to the well site via trucking.

SUMMARY

Embodiments of the present methods and systems can be configured to induce significant pressure gradients downbore by utilizing electrochemical reactions with metals (e.g., in a targeted manner), thereby reducing cost and complex logistics.

Some embodiments of the present methods (e.g., to facilitate extraction of subterranean hydrocarbons from a geologic structure) comprise: injecting a first fluid composition comprising a base metal and proppant particles into a first wellbore that extends into the geologic structure, the base metal particles having a first density and the proppant particles having a second density, wherein a ratio of the second density to the first density is equal to or less than 5; wherein corrosion of the base metal in the wellbore results in electrochemical oxidation of the base metal and electrochemical reduction of a reducible species that generates a gaseous product, thereby increasing the subterranean pressure in at least a portion of the wellbore; and wherein the base metal corrodes in the wellbore at a rate sufficient to produce a gaseous product that induces fractures within the geologic structure, and at least some of the induced fractures are kept open by the proppant particles thereby facilitating egress of hydrocarbons from the geologic structure. In some embodiments, a ratio of the second density to the first density is equal to or less than 2. In some embodiments, a ratio of the second density to the first density is equal to or less than 1.2. In some embodiments, a ratio of the second density to the first density is equal to or less than 1.1. In some embodiments, a ratio of the second density to the first density is equal to or less than 1.02.

Some embodiments of the present methods (e.g., to facilitate extraction of subterranean hydrocarbons from a geologic structure) comprise: injecting a first fluid composition comprising a base metal into a first wellbore that extends into the geologic structure; wherein corrosion of the base metal in the wellbore results in electrochemical oxidation of the base metal and electrochemical reduction of a reducible species that generates a gaseous product and a metal oxide product; wherein the gaseous product increases the subterranean pressure, thereby inducing fractures within the geologic structure; and wherein induced fractures are kept open by the metal oxide product, thereby facilitating hydrocarbon egress from the geologic structure. In some embodiments, the metal oxide product comprises less than 40% fines under 2,000 to 14,000 psi closure pressure, and acts as a fracture proppant after it is formed within the wellbore. In some embodiments, the metal oxide product comprises less than 30% fines under 2,000 to 14,000 psi closure pressure, and acts as a fracture proppant after it is formed within the wellbore. In some embodiments, the metal oxide product comprises less than 10% fines under 2,000 to 14,000 psi closure pressure, and acts as a fracture proppant after it is formed within the wellbore. In some embodiments, the metal oxide product has a conductivity range from 100 millidarcies per foot for a 14,000 psi closure stress to 40,000 millidarcies per foot for 2,000 psi closure stress.

Some embodiments of the present methods (e.g., to facilitate extraction of subterranean hydrocarbons from a geologic structure by sequentially injecting alternate stages of fracturing fluid compositions from a wellhead into a wellbore) comprise: injecting a first fluid composition comprising base metal particles into the wellbore for a first predetermined time period; injecting a second fluid composition comprising an activating additive into the wellbore for a second predetermined time period; wherein the first fluid and second fluid are injected in sequence to produce an electrochemical reaction at a distance from the wellhead; wherein the activating additive activates a corrosion process resulting in electrochemical oxidation of the base metal and electrochemical reduction of a reducible species; and wherein the electrochemical reaction between the base metal and a reducible species that generates a gaseous product and a metal oxide product. Some embodiments further comprise: injecting a third fluid composition comprising a deactivating additive for a third predetermined time period, wherein the deactivating additive deactivates the corrosion process. In some embodiments, the distance from the wellhead is within a predetermined range. In some embodiments, the predetermined distance range from the wellhead is determined by the first predetermined time period, the second predetermined time period, or both. In some embodiments, the first predetermined time period and the second predetermined time period are each between 10 seconds and thirty minutes. In some embodiments, the first predetermined time period and the second predetermined time period are each between 50 seconds and 500 seconds. In some embodiments, the electrochemical reaction rate is adjusted by altering the injection rate of the first fluid composition, the second fluid composition, or both. Some embodiments further comprise: injecting fluids comprising proppants that differ in at least one of: density, size, concentration, and a combination thereof. Some embodiments further comprise: alternating injection of fluids with proppant and fluids without proppant.

In some embodiments of the present methods, the base metal particles are encapsulated by an encapsulating material, and the second fluid composition comprises an activating additive that dissolves the encapsulating material. In some embodiments, the base metal particles are encapsulated by a surfactant, polymer, sulfate, carboxylate, ester, other less reactive metals, other metals that react at a different pH or in response to other stimuli, or a combinations thereof. In some embodiments, the base metal corrodes in the wellbore at a rate that is low enough to produce a gaseous product that provides local sustained pressure substantially without inducing fractures in the geologic structures.

In some embodiments of the present methods, the base metal comprises one or more of: alkaline metals, alkaline earth metals, transition metals and metalloids. In some embodiments, the base metal comprises one or more of: aluminum, magnesium, sodium, calcium, zinc, indium, lead, manganese, chromium, iron, cadmium, cobalt, nickel, tin, lead, boron, silicon, and combinations thereof. In some embodiments, the base metal comprises one or more of: aluminum, magnesium, or a combination thereof. In some embodiments, the base metal is configured in a physical form having a particles with an aggregate transverse dimension of between 1 and 100 microns. In some embodiments, at least a portion of the base metal comprises a physical form of one or more of: a powder, particles, and flakes.

In some embodiments of the present methods, the first fluid composition further comprises a surface passivating additive. In some embodiments, the surface passivating additive is configured to degrade over time. In some embodiments, the surface passivating additive comprises an anion. In some embodiments, the surface passivating additive includes one or more of: a sulfate, a phosphate, a nitrite, a chromate, a phosphonate, and a molybdate.

In some embodiments of the present methods, the activating additive comprises one or more of: an acid, an acid precursor, a halide ion, and a combination thereof. In some embodiments, the activating additive decreases the pH proximal to the base metal. In some embodiments, the activating additive decreases a hydrogen overvoltage of the base metal. In some embodiments, the activating additive disrupts a passive oxide film of the base metal.

In some embodiments of the present methods, the reducible species comprises water and the gaseous product comprises hydrogen gas.

Some embodiments of the present methods further comprise: injecting a third fluid composition comprising a deactivating additive into a wellbore; wherein the deactivating additive deactivates the corrosion process such that the rate of electrochemical oxidation of the base metal and electrochemical reduction of a reducible species is decreased. In some embodiments, the deactivating additive comprises one or more of: a water, an acid, an acid precursor, a base, a base precursor, an anion, an amine, an amine ester, an organoamine, a nitrite, a borate, a phosphate, a phosphate ester, a dispersant, and any combination thereof. In some embodiments, the deactivating additive increases the pH proximal to the base metal. In some embodiments, the deactivating additive increases a hydrogen overvoltage of the base metal. In some embodiments, the deactivating additive increases the pH in proximity to the base metal.

Some embodiments of the present methods further comprise: substantially sealing a portion of the wellbore after injection of the second fluid composition to restrict the sealed portion of the subterranean volume and thereby maximize a pressure gradient resulting from generation of the gaseous product. In some embodiments, a branching bore extends from the first wellbore into the geologic structure. Some embodiments further comprise: selectively providing the first fluid composition comprising a base metal into the branching bore; and injecting the second fluid composition comprising an activating additive into the branching bore.

Some embodiments of the present methods further comprise: maximizing local pressure gradients within the geologic structure by selectively positioning the first fluid composition in a localized manner within the wellbore, within a branching bore, within a natural subterranean discontinuity (fissures, pores, fractures, joint, faults), proximal to natural deposits of ore (vein, seam pockets), proximal to natural deposits of minerals, or combinations thereof. Some embodiments further comprise: maximizing local pressure gradients within the geologic structure by selectively positioning the second fluid composition in a localized manner within the wellbore, within a branching bore, within a natural subterranean discontinuity (fissures, pores, fractures, joint, faults), proximal to natural deposits of ore (vein, seam pockets), proximal to natural deposits of minerals, or combinations thereof.

In some embodiments of the present methods, the geologic structure comprises one or more of: a shale formation, a siltstone formation, a sandstone formation, and a conglomerate formation. In some embodiments, the subterranean hydrocarbons comprise one or more of: natural gas, natural gas liquids, kerogen, coal seam gas, tight gas, shale gas, tight oil, shale oil, coal bed methane, gas hydrates.

Some embodiments of the present methods comprise: extracting the first fluid composition from a wellbore (e.g., in fluid communication with a plurality of fractures formed by any of the present methods).

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements Likewise, a method that "comprises," "has," "includes," or "contains" one or more steps possesses those one or more steps, but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION OF ILLUSTRATIVE EMBODIMENTS

Conventional hydrocarbon recovery methods like hydraulic fracturing transfer energy downbore via compressed fluids to crack deep rock by increasing subterranean pressures; pressures can reach up to 15,000 psi. With standard hydraulic fracturing, bulk pressure is applied hydraulically and hydrostatically (as in the hydrostatic state of stress: σ1=σ2=σ3), and anywhere that fluid is extended, the state of stress is, by definition, hydrostatic. For a crack to propagate, it must find a gradient in pressure and weakness in the formation. In conventional fracturing, complex and resource-intensive logistics are required so that millions of gallons of fluid inundate and flood the hydrocarbon-rich formation, thereby limiting the "activated volume" (active volume being a measure of the effective volume of the formation that is actually going to produce gas). Embodiments of the present methods can be configured to facilitate extraction of subterranean hydrocarbons from geologic structures with the use of electrochemical metal oxidation processes (i.e., corrosion). Gaseous products of the corrosion process may produce fractures within a geologic structure comprising hydrocarbons. Non-limiting examples of geologic structures include: shale formations, siltstone formations, sandstone formations, and conglomerate formations. The subterranean hydrocarbons may be in the form of petroleum (i.e. liquid), natural gas, natural gas liquids, kerogen, coal seam gas, tight gas, shale gas, tight oil, shale oil, coal bed methane, gas hydrates or a combination thereof. In some embodiments, the subterranean hydrocarbon(s) includes natural gas.

Figure 1:
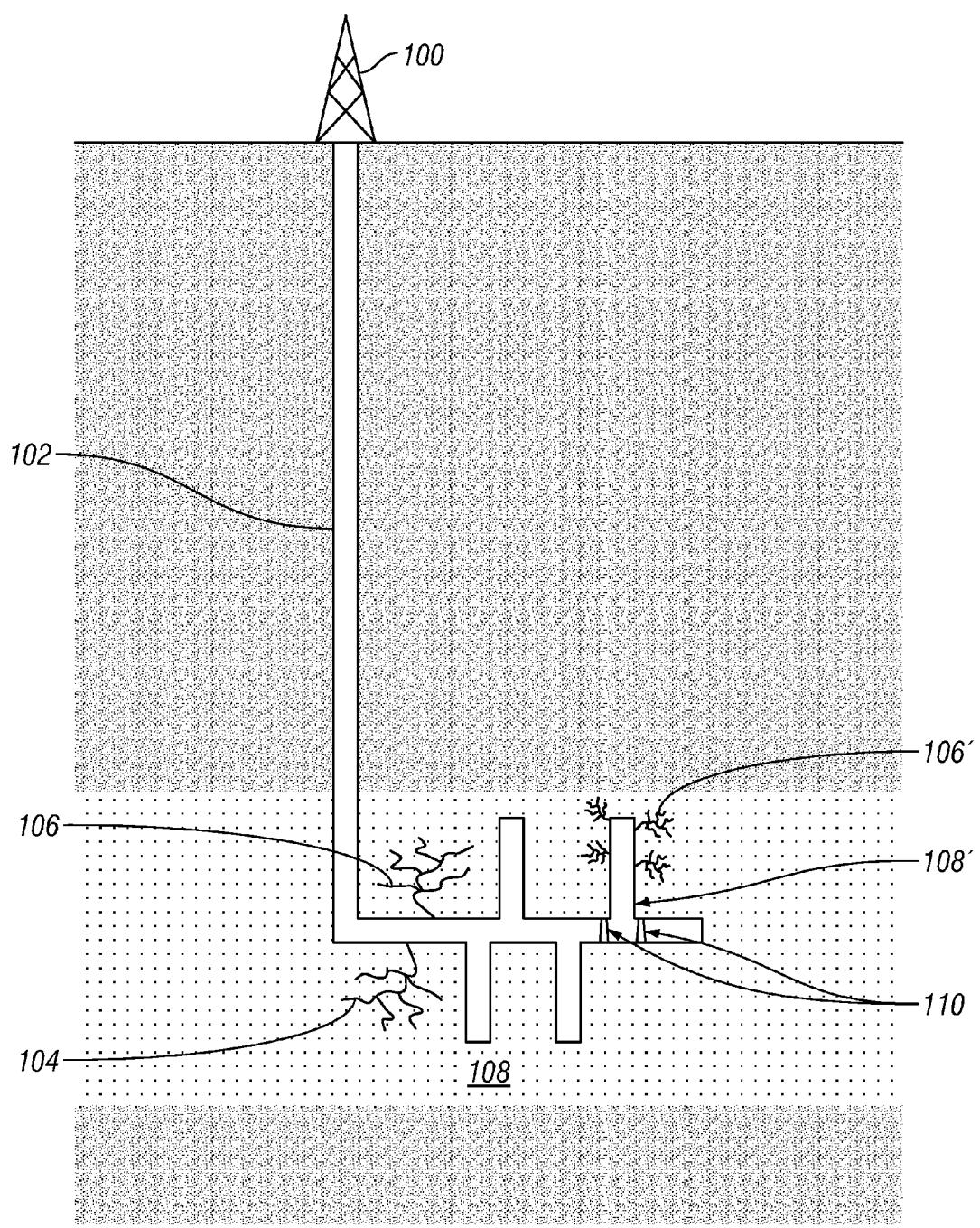
FIG. 1 illustrates a cross-sectional view of a first embodiment of the present systems for facilitating extraction of subterranean hydrocarbons from a geologic structure.

Referring now to FIG. 1, embodiments of the present methods injecting (e.g., via one or more pumps) a first fluid composition comprising a base metal into a first wellbore 102 extending from the wellhead 100 into a geologic structure 104 comprising subterranean hydrocarbons. In some embodiments, once the base metal is positioned within wellbore 102 via the first fluid, a second fluid composition comprising an activating additive may be injected into wellbore 102. The activating additive can be configured to, in the presence of the first fluid and/or the base metal, initiate a corrosion process resulting in electrochemical oxidation of the base metal and electrochemical reduction of a reducible species to generate a gaseous product, thereby increasing subterranean pressure and inducing a subterranean pressure gradient to cause fractures 106 within the geologic structure.

In some embodiments, the reducible species may be a proton-containing species, such as, for example, connate water or water transported into the wellbore from the wellhead 100. In such embodiments, the gaseous product may comprise hydrogen gas.

In some embodiments, the activating additive may comprise an acid or acid-precursor such that the local pH proximal to the base metal is decreased, thereby accelerating the rate of corrosion. The associated corrosion process occurring at a surface of a particle of the base metal can be expressed by the anodic reaction in Equation 1 and the cathodic reaction in Equation 2:

$$M \rightarrow M^{n+} + ne^- \quad (1)$$

$$(nH)_2O + ne^- \rightarrow nOH^- + \frac{n}{2}H_2(g). \quad (2)$$

The term base metal is used herein to describe any metal that oxidizes or corrodes more easily and/or more quickly than noble or precious metals. In some embodiments, the base metal comprises one or more metals selected from the group of alkaline metals, alkaline earth metals, transition metals, and metalloids. For example, the base metal(s) can comprises sodium, calcium, zinc, indium, lead, manganese, chromium, iron, cadmium, cobalt, nickel, tin, lead, boron, silicon, and/or a combination thereof. In some embodiments, the base metal(s) can comprise aluminum, magnesium, and/or a combination thereof. In some embodiments, the base metal(s) may comprise one or more constituents of an alloy.

The electrochemical nature of the base metal and the surrounding subterranean environment will generally influence the corrosion rate and associated subterranean pressure gradient. Not to be bound by any particular theory, in many circumstances, a mixed potential of the base metal will arise according to simultaneous anodic polarization (eq. 1) and cathodic polarization (eq. 2) of the metal. For sustained corrosion of the base metal, the rate of metal oxidation (eq. 1) must be equal to the rate of reduction (eq. 2); the point at which these rates are equivalent occurs at the intersection represented by a mixed potential, or corrosion potential. This corrosion potential serves as the overvoltage reference point; the overvoltage defines the polarization of a corroding metal in terms of the potential difference between the corrosion potential and the thermodynamic equilibrium potential of the particular reactions involved in the corrosion process.

Not to be bound by any particular theory, in some embodiments, the hydrogen overvoltage may control the rate of corrosion; hydrogen overvoltage is the difference between the corrosion potential and the thermodynamic equilibrium potential of the reduction of hydrogen ions to hydrogen gas $E^{rev}$ as expressed in Equation 3:

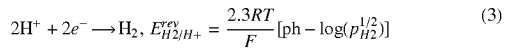

$$2H^+ + 2e^- \longrightarrow H_2, E^{rev}_{H2/H+} = \frac{2.3RT}{F}[ph - \log(p_{H2}^{1/2})] \quad (3)$$

where R is the ideal gas constant, T is the temperature, and F is Faraday's constant. It can be seen from eq. 3 that $E^{rev}$ is dependent on the acidity (pH) and the partial pressure of hydrogen PH2.

For metals with large hydrogen overvoltages (e.g., Zn, In, Pb), the actual overvoltage experienced by the metal may be dramatically smaller than that anticipated by the electrochemical series. For other base metals (e.g., Al, Mg, Na, Ca, and the like), over which water reduction is typically facile, substantial hydrogen overvoltages may be established. The hydrogen overvoltage may be varied by the concentration of activating additives and/or deactivating additives in the subterranean environment proximal to the base metal surface.

It may be appreciated that within the subterranean wellbore 102, the hydrogen overvoltage experienced by the base metal may drive the $H_2$ gas from the reaction interface at a significant pressure to produce substantial pressure gradients resulting in fractures 106. Under standard temperature-pressure conditions, that pressure may be observed as the nucleation of minuscule bubbles at the hydrophilic base metal interface (generating a bubble of radius equal to the Laplace pressure induced by its surface tension, which is augmented (smaller radius) by the hydrophilicity of the interface). These bubbles often have short lifetimes in undersaturated conditions as their small size and high pressure drives rapid diffusion into the surrounding environment.

Not to be bound by any particular theory, if the partial pressure of product hydrogen gas $p_{H2}$ is allowed to build in an essentially closed volume, the equilibrium potential $E^{rev}$ (eq. 3) approaches a value equivalent to the equilibrium potential of eq. 1, meaning no net reaction of metal ions (i.e., no further corrosion). For example, in the case of aluminum as the base metal, these pressures can be tens of thousands of psi (assuming 50 C subterranean temperatures).

In some embodiments, the base metal particles are configured to have a large surface area (i.e., a surface area larger than that of spheres with similar maximum transverse dimensions), thereby accelerating the corrosion reaction relative to particles with smaller surface areas. For example, in some embodiments, particles can be in a physical form having a ratio of surface area to volume and/or a high ratio (e.g., of 3:1 or greater) of surface area to transverse dimension (e.g., a particle with a maximum transverse dimension of 1 micron can be configured to have a surface area of 3 microns squared, or greater). The base metal may, for example, be in the form of a powder, flakes, and/or any other particle shape, or a combination thereof. In some embodiments, the aggregate (average) transverse dimension of the particles may be between 1 micron and 1 millimeters (e.g., less than any one of, or between any two of: 0.001 mm, 0.005 mm, 0.01 mm, 0.05 mm, 0.1 mm, 0.5 mm, and/or 1 mm), or may range from 1 micron to 1 mm. For example, in initial fracturing ("fracking") operations, the base metal may have an aggregate transverse dimension of up to 0.1 mm, and/or in operations to open or maintain existing fractures, the base metal may have an aggregate transverse dimension of greater than 0.1 mm. As a non-limiting example, base metal particles with a an aggregate transverse dimension of 100 microns or smaller may be positioned within a 15 cm diameter wellbore at a 50% filling factor (50% of volume of bore occupied by base metal particles, or a 1:1 ratio of fluid:base metal in a section of wellbore that is substantially filled); assuming a corrosion current of 1 mA/cm$^2$, the current produced would approach 5,000 amperes per meter length of bore. This represents a significant amount of energy which can be strategically situated within the wellbore to facilitate hydrocarbon production.

In some embodiments, the first fluid composition comprises a surface passivating additive such that the surface of the base metal is at least initially protected from corrosion, such as, for example during shipping and/or during transport downbore. In some embodiments, the surface passivating additive may comprise an anion. For example, the surface passivating additive may comprise one or more components selected from the group of sulfates, phosphates, nitrites, chromates, phosphonates, molybdates, or a combination thereof. In some embodiments, the metal may have characteristic native oxides which provide a surface passivation function.

In some embodiments, the activating additive may comprise one or more of an acid or an acid precursor (e.g., sulfuric acid, glycolic acid, carboxylic acid), a halide ion, or a combination thereof. In pH-neutral waters, the anodic corrosion of some metals (e.g., aluminum, magnesium, zinc) may develop enough energy to split water directly (eq. 2). In some embodiments, the activating additive may decrease the pH proximal to the base metal. Under acidic conditions, the corrosion process may initiate and/or corrosion rates may substantially increase. The primary requirement in most, if not all, embodiments is that the activating additive increase the rate of corrosion. For example, hydrochloric acid may be injected into the wellbore to increase the rate of corrosion of the downbore base metal. In some embodiments, the activating additive decreases the hydrogen overvoltage of the base metal, thereby facilitating higher corrosion rates. In other embodiments, the activating additive may comprise a base or a base precursor, so long as the rate of corrosion is increased.

In some embodiments (e.g., those in which the base metal particules include a passivating oxide film), the activating additive is configured to disrupt the passive oxide film (e.g., localized breakdown of a passivating oxide film by anions, such as, for example chloride ions). Not to be bound by any particular theory, such anions may induce localized dissolution of the passive oxide of the base metal at weaker discontinuities (e.g. grain boundary, dislocation, inclusion, etc.) and thereby expose the underlying base metal.

Standard hydraulic fracturing is generally limited in that the accessibility of the hydrocarbon resource is primarily a function of the hydraulic pressure generated at a wellhead and associated distance from a primary wellbore through perforations (ca. 200-500 ft). The present methods, however, can extend the fracturing radius from the primary wellbore, thereby improving resource accessibility and hydrocarbon production. The present methods can thereby increase the total production of hydrocarbon resource beyond that provided by conventional hydraulic fracturing for a given perforated interval, by extending access into the resource via a reactive chemistry capable of providing localized, sustained pressure sources. The methods described herein can be implemented to supplement hydrocarbon production in a complementary approach to (e.g., in combination with) conventional hydraulic fracturing.

The rate of oil and/or natural gas extraction from hydraulically fractured wells may be limited in part by the inability of the fracturing fluid to create high pressure gradients at linear distances of more than a few hundred feet from the perforated horizontal bore. The loss of static pressure due to fluid diffusion into the surrounding rock and the strong viscous forces acting on the flow in each fracture result in decreased pressure at the fracture tip and thereby limit the extent of the fracture into the rock.

Figure 4:
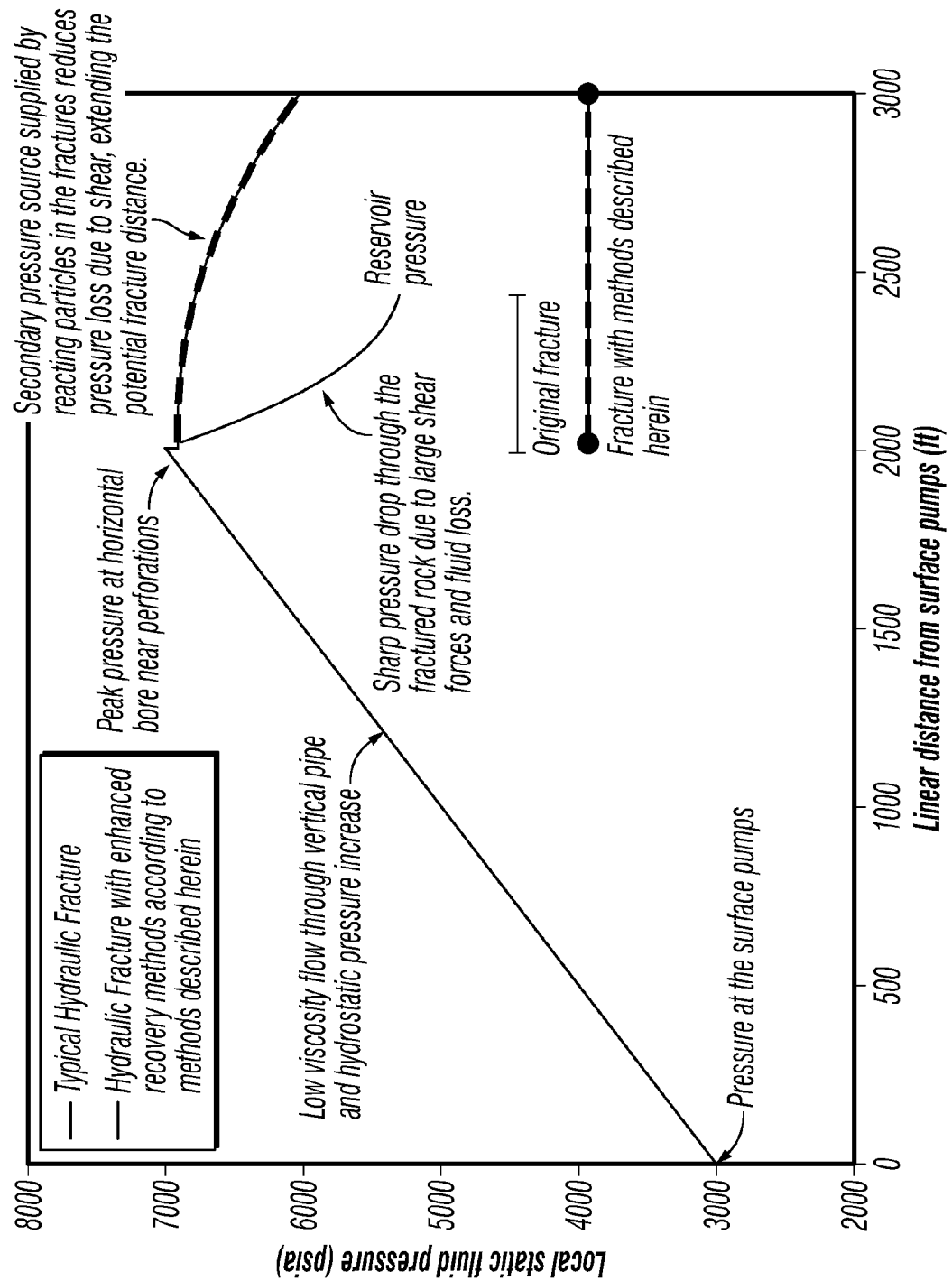
FIG. 4 illustrates conventional fracture fluid pressure (solid line) and an increased fracture flow pressure (dashed line) extending into the effective fracture length resulting from enhanced recovery methods described in this disclosure, in a plot of local static fluid pressure (psia) vs. linear distance from surface pumps at wellhead (ft).

As depicted in FIG. 4, during the hydraulic fracturing process, an increased pressure is induced at a linear distance from the wellhead surface pumps as depicted in the solid line. The peak pressure may be focused at a predetermined distance from the wellhead due to perforations and/or sliding sleeves. The predetermined linear distance from the wellhead is depicted at about 2,000 ft. from the wellhead in FIG. 4, however the predetermined distance from the wellhead may be any suitable distance to reach the hydrocarbon resource. In conventional hydraulic fracturing, a sharp pressure drop typically occurs through the fractured rock due to large shear forces and fluid loss, as depicted by the solid line beyond 2,000 ft in FIG. 4. In an embodiment of the invention depicted by the dashed line in FIG. 4, a secondary pressure source is supplied by reacting base metal particles in the fractures, thereby extending the fracture distance.

As indicated in FIG. 4, the present methods may be implemented to provide an increase in the supplied pressure at a fracture tip at a greater distance from the surface pumps and/or from the horizontal wellbore that exceeds that of conventional hydraulic fracturing, resulting in further tip propagation and ultimately increased fracture length, overall exposed surface area, and drainage volume. It may further be appreciated that the increased fracture length can improve well extraction rates, increase the number of economically feasible well sites, decrease the number of required wells at the surface for a particular site, and/or allow for re-activation and extraction of abandoned wells.

In some embodiments, one or more fluid compositions injected into geologic structure comprise a proppant. Before, during and/or after fracturing, proppant materials may be injected into the wellbore to keep induced fractures open. For example, the proppant may be added to the first fluid composition, the second fluid composition, a third deactivating compostion, or a combination thereof. In some embodiments, the first fluid composition includes proppant particles to situate proppants in close proximity to the reaction interface.

In some embodiments, the base metal of the present methods may be entrained in a flow along with traditional proppants, to be embedded deep within each fracture. In accordance with the desired operating conditions and environmental conditions of a particular well, the base metal particles may be activated to react, for example, with the water in the fracturing fluid and/or connate water to produce hydrogen gas at high pressure. This gas, in turn, acts as a secondary pressure source originating deep within the fracture to augment the pressure supplied by surface pumps. The present methods may be employed in a complementary approach to conventional hydraulic fracturing at any step and in any combination of the fracturing stages described in the following paragraphs.

Conventional hydraulic fracturing may comprise a perforation stage wherein a perforating gun is lowered into a targeted position within the horizontal portion of the wellbore to puncture, or perforate, the steel well casing (e.g., and surrounding cement) and thereby create small cracks, or fractures, within the formation surrounding the wellbore. In some embodiments, the base metal(s) and/or activating additives may be incorporated into a perforation gun or tip such that the base metal(s) and/or activating additives are delivered downhole during the perforating stage (e.g., as the casing is perforated). In some embodiments, sliding sleeves may also be employed. For example, a fracture port may be exposed at a particular sleeve section and a targeted injection of base metal may be affected, activating additive or a combination thereof may flow in a targeted manner through the exposed fracture port.

In conventional hydraulic fracturing, a spearhead stage, which may also be referred to in the art as an acid stage, is employed to clear debris and/or formations (carbonates, siliceous formations and so on) within the wellbore to provide a clear pathway for fracture fluids to access the formation. The spearhead or acid stage generally includes injecting or pumping diluted acid and/or friction reducer in the wellbore. Commonly, a mix of water with diluted acid, such as hydrochloric acid is employed. Depending on the formation, the particular acid and its concentration may be altered. For example, acid treatment of siliceous formations may be distinguished from acid treatment of carbonate formations. Carbonate formations may be treated with a variety of acid systems, including hydrochloric, acetic and formic aids. In some embodiments of the present methods, dilute acid of the spearhead stage acts as an activator for previously positioned base metal particles and an acid system may be employed to control the electrochemical reaction rate.

Conventional hydraulic fracturing may include a pad stage in which a batch of carrying fluid without proppant is injected to break the formation and initiate fracturing of a target formation. Commonly, the carrying fluid may comprise a surfactant, biocide and/or clay stabilizer. In some of the present methods, the injected fluid composition may further comprise base metal particles. For example, the base metal particles may be injected during the pad stage for positioning before a proppant stage, as part of a high viscosity pad stage fluid and/or as part of a high pH (e.g. >pH 7) pad stage fluid. In some embodiments, the pad stage fluid may comprise the base metal particles such that the electrochemical reaction is prevented or deactivated by the high pH level. In other embodiments, the spearhead stage may comprise the base metal particles and the electrochemical reaction is activated as a result of the high pH of the pad stage. A high pH will activate corrosion of some metals while a low pH will activate corrosion of others, with the respective opposite end of the pH scale passivating or deactivating corrosion of the metal. For example, corrosion of magnesium will typically be activated by a low pH and deactivated by a high pH (e.g., above 10); and corrosion of aluminum will be activated by a high pH, deactivated by a low pH (e.g., below 5.5), and reactivated again at very low pH (e.g., near 0).

In some embodiments, it can be useful to delay the onset of the electrochemical reaction such that the reaction occurs at a predetermined distance range (e.g., 2000+/−200 feet) from the wellhead. Delayed action may also be useful for reducing friction pressures, for example, in high rate and/or deep well applications. In some embodiments, for example, the present methods comprises sequentially injecting alternate stages of fracturing fluid compositions from a wellhead into a wellbore. For example, a first fluid composition comprising base metal particles may be injected into the wellbore for a first (e.g., predetermined) time period, and subsequently, a second fluid composition comprising an activating additive may be injected into the wellbore for a second (e.g., predetermined) time period. These injections may be alternated for any suitable number of cycles. The alternate stages can delay the electrochemical reaction (e.g., a majority of the electrochemical reaction) until the base metal reaches a predetermined distance (e.g., range) from the wellhead, wherein the activating agent or additive activates a corrosion process resulting in electrochemical oxidation of the base metal and electrochemical reduction of a reducible species. In some embodiments, the electrochemical reaction generates a gaseous product and a metal oxide product. Some embodiments include injecting a third fluid composition comprising a deactivating additive or agent for a third (e.g., predetermined) time period. The first, second, and third periods may be the same or may differ.

The process of sequentially injecting alternate stages of fracturing fluid compositions allows for generating a target pressure source at a predetermined distance (e.g., range) from the wellhead, which may be adjusted by altering the first time period, the second time period, or both. For example, in some embodiments, the first predetermined time period and the second predetermined time period are each between 10 seconds and thirty minutes. In some embodiments, the electrochemical reaction rate may be adjusted by varying the pumping rate of the first fluid composition, second fluid composition, or both. For example, the pumping rate may be roughly 7 gal/s in a wellbore approximately 4.5 inches in diameter, resulting in an average flow rate on the order of 8 ft/s. Given a 2,000 ft long wellbore to target area, the delay may be close to 250 seconds, which represents the time from mix at surface to reaching the horizontal perforations.

In conventional hydraulic fracturing, a proppant stage may be employed wherein a fluid composition comprising proppant particles (e.g. sand) is injected into the wellbore. The proppant generally includes particles of high-strength material that may be carried by the fracture fluid into the formation and deposited. The proppant remains in the formation once the pressure is reduced and 'props' open the fracture network. In addition to proppant, the fluid composition of the proppant stage may further comprise gel and/or crosslinker. In an embodiment of the invention, the base metal particles are injected into the wellbore during the proppant stage, to help ensure placement with co-proppant (e.g. sand) to hold open induced fractures.

In some embodiments of the present methods, the base metal particles and proppant particles are concurrently transported downbore to synergistically facilitate the egress of hydrocarbons. This may avoid undesirable processes, which may be known in the art as "humping" and/or "screening out," that can drastically limit the efficiency of hydraulic fracturing. In some such embodiments, a first fluid composition comprising base metal particles and proppant particles are injected into the wellbore, where the base metal particles having a first density and the proppant particles having a second density that does not differ from the first density (e.g., wherein a ratio of the second density to the first density is equal to or less than 5). In some such embodiments, the base metal corrodes in the wellbore at a rate sufficient to produce a gaseous product that induces fractures within the geologic structure, and at least some of the induced fractures are kept open by the proppant particles to facilitate egress of hydrocarbons from the geologic structure. In a synergistic manner, corrosion of the base metal induces fractures, which are kept open by the proppant or co-proppant. In some embodiments, the ratio of the proppant particle density to the base metal particle density is equal to or less than 5. For example, the density of a silica-rich proppant particle is around 2.65 g/cc and the density of a lithium base metal particle is 0.53 g/cc, setting the ratio equal to or less than 5. As another example, the density of a silica-rich proppant particle is around 2.65 g/cc and the density of a sodium base metal particle is 0.97 g/cc or potassium base metal particle is 0.89 g/cc, setting the ratio equal to or less than 3. In other embodiments, the ratio of the proppant particle density to the base metal particle density is equal to or less than 2. For example, the density of a silica-rich proppant particle is around 2.65 g/cc and the density of an aluminum base metal particle is 2.7 g/cc or magnesium base metal particle is 1.74 g/cc, setting the ratio equal to or less than 2. In some embodiments, the difference in density between the base metal particles and the proppant particles is less than 20% (e.g., a proppant particle density: base metal particle density ratio of 1.2), less than 10% (e.g., a proppant particle density: base metal particle density ratio of 1.1), or less than 2% (e.g., a proppant particle density: base metal particle density ratio of 1.02), thereby providing precise co-flow of proppant and base metal particles.

In a conventional hydraulic fracturing process, the proppant concentration in the fracturing fluid may be gradually increased as a fracturing process continues, for example from ¼ lb/gallon fracturing fluid to 3 lb/gallon of fracturing fluid. In such embodiments, the concentration of base metal may be increased in a proportional manner following the co-proppant to ensure concurrent placement.

In some embodiments, the proportion of metal and proppant may be tuned to optimize effect depending on desired operating conditions and environmental factors. For example, initially the proppant concentration may be at the maximum e.g. 3-5 lb/gallon, and after a predetermined quantity has been pumped downbore, the base metal may be pumped downbore either singularly or with the co-proppant, thereby driving the initial slug of proppant further into the formation.

In some embodiments of the present methods, the product of the electrochemical reaction may act as a proppant, such that the base metal produces a localized pressure source while at the same time forming proppant particles. In such embodiments, electrochemical oxidation of the base metal and reduction of a reducible species (e.g. water) generates a gaseous product (e.g. dihydrogen gas) and a metal oxide proppant product. For example, in a traditional fracking application, approximately 300,000 lbs of proppant particles may be injected for a 120 ft section of pipe, whereas in certain of the present embodiments, approximately 50% of that amount (150,000 lbs) may be replaced or substituted with base metal (e.g., aluminum or magnesium) that is then largely if not wholly consumed in the corrosion reaction to form the metal oxide product (e.g., aluminum oxide or magnesium oxide) that can act as a proppant once formed. The gaseous product increases the subterranean pressure, thereby inducing fractures within the geologic structure and the induced fractures are kept open by the metal oxide product, thereby facilitating hydrocarbon egress. In such embodiments, the metal oxide product can have comparable mechanical strength and physical characteristics to conventional proppant particles employed in hydraulic fracturing, which may be optimized based on the particular geologic formation. For example, the metal oxide product may comprise less than 40% (e.g., less than 30%, 20%, etc.) fines under 2,000 to 14,000 psi closure pressure. For example, the relative amount of fines generated in the reaction process can be varied with corrosion rate (e.g., the concentration and/or pH of activating and/or deactivating agents), the particle size of the base metal, and/or the like. In some embodiments, the metal oxide product has a conductivity range from 100 millidarcies per foot for a 14,000psi closure stress to 40,000 millidarcies per foot for 2,000 psi closure stress.

A conventional hydraulic fracturing process may comprise a flush stage following the proppant stage. During the flush stage, a volume of "fresh" water is pumped down the wellbore to flush out any excess proppant that may be present in the wellbore and potentially block hydrocarbon egress. The flush stage fluid composition may comprise a friction reducer, acid, fresh water, scale inhibitor, an activating additive or agent, a deactivating additive or agent, and/or a combination thereof. In some embodiments, the flush stage may comprise an activating additive or agent that is configured to activate the base metal particles positioned in the proppant stage. In other embodiments, the flush stage may act as a deactivating fluid composition. For example, water may act as a diluent, thereby lowering the electrochemical reaction rate. In some embodiments, the flush stage may comprise a deactivating additive that may increase the downbore pH.

In some embodiments, metal particles remain with a co-proppant (e.g. sand) deep within the fracture after the flush stage. Trapped fluid, which often remains in the fracture due to surface tension and inhibits oil extraction due to resistive capillary pressure, continues to react with the embedded metal consuming a portion of the fluid and producing hydrogen gas to drive additional fluid out of the fracture. It may be appreciated that this post-fracture reaction increases the available surface area for hydrocarbon diffusion into the wellbore and thereby improves the efficiency and productivity of the well.

In some embodiments, the fracturing fluids will have differing compositions of co-proppants having a contrast in at least one of the following properties: density, size, concentration and a combination thereof. In some embodiments, the method further comprises alternating proppant-stages and proppant-free stages.

The present methods can increase the total production of hydrocarbon resource relative to conventional hydraulic fracturing for a given wellbore, as the present methods can facilitate extension of the fracturing volume through perforation through the primary wellbore. The proposed methods supplement hydrocarbon production via conventional hydrocarbon fracturing in an approach that is complementary to conventional hydraulic fracturing.

In some embodiments, the activating additive may be an oxidizing agent. For example, the activating additive or agent may be selected from the group of ammonium persulfate, hydrogen peroxide, nitric acid, sulfuric acid, perchlorate, chlorite, chlorate, permanganate, sodium perborate, and/or derivatives or combinations thereof.

In some embodiments, the base metal, activating agent, deactivating agent or a combination thereof may be encapsulated to allow delayed release into the fracturing fluid, preventing it from reacting too quickly so that the reactive chemistry is controlled. For example, the base metal particles can be encapsulated by a surfactant, polymer, sulfate, carboxylate, ester, other less reactive metals, other metals that react at a different pH or in response to other stimuli, or a combinations thereof.

In some embodiments, a third fluid composition comprising a deactivating additive may be injected into the geologic formation (e.g., via wellbore 102). In such embodiment, the deactivating additive can be configured to deactivate the corrosion process such that the rate of electrochemical oxidation of the base metal and electrochemical reduction of a reducible species is decreased. As such, the deactivating agent generally will be particular to the chemistry of the base metal, activating agent, and/or surrounding environment. The deactivating additive may act as a corrosion inhibitor by creating a thin film between the metal and the surrounding subterranean environment, retarding the redox reaction (gain or loss of electrons), act as a dilution agent (e.g., water), oxygen scavenging, proton scavenging, buffering or by any other suitable mechanism. For example, the deactivating additive composition may comprise one or more of: water, acid or an acid precursor, a base or a base precursor (e.g., sodium hydroxide, ammonia, water), an anion, amines, amine esters, organoamines, nitrites, borates, phosphates, phosphate esters, dispersants and any combination thereof.

In some embodiment, the deactivating additive increases the pH proximal to the base metal, thereby decreasing the rate of electrochemical corrosion. For example, the addition of aqueous sodium hydroxide into the wellbore subsequent to an acidic activating additive may neutralize the subterranean environment, and arrest the corrosion reaction and formation of gaseous product. Not to be bound by any particular theory, in some embodiments, the deactivating additive may increase the hydrogen overvoltage of the base metal.

In some embodiments, the breakdown of a passive oxide of the base metal by activating anions may be mediated by deactivating anions which may stabilize the passive oxide. Accordingly, the ratio of activating species to deactivating species will directly affect the corrosion rate.

Figure 2:
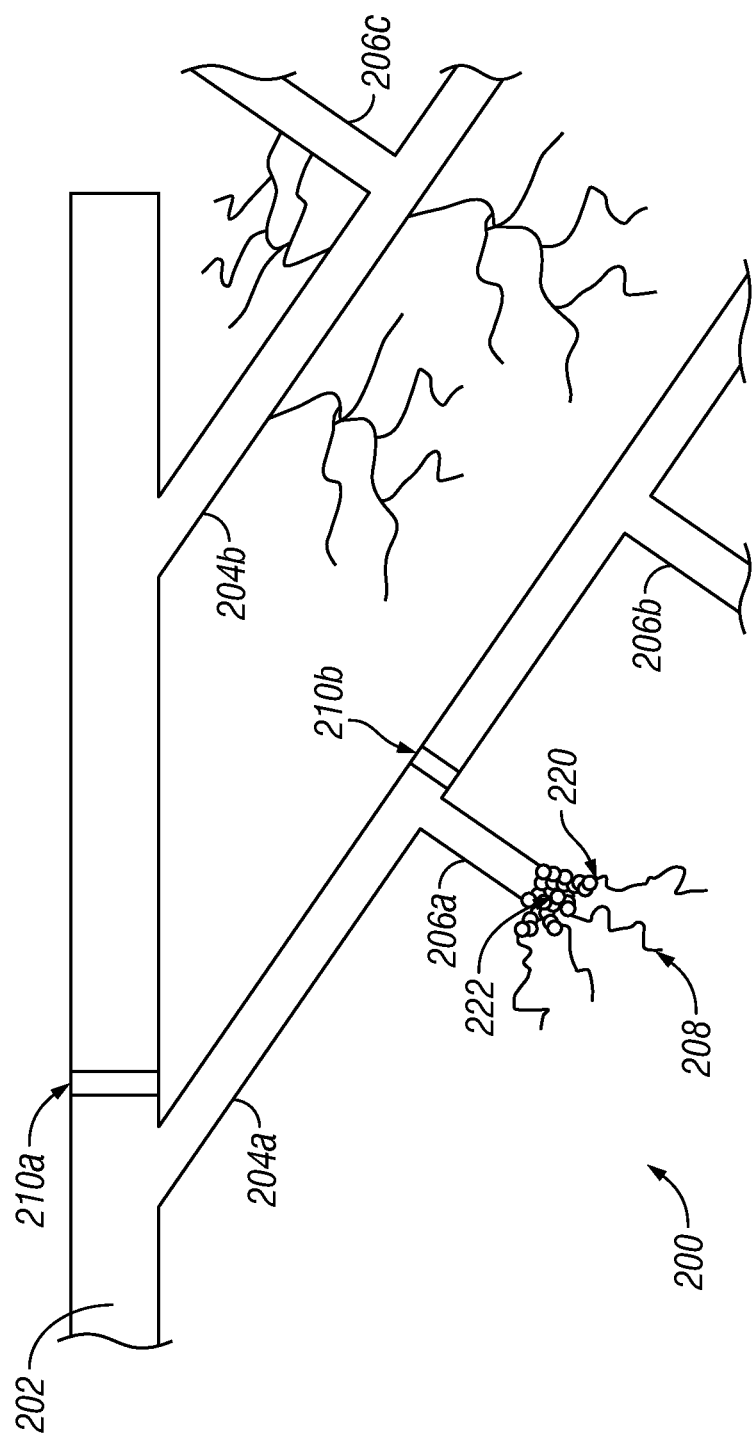
FIG. 2 illustrates a cross-sectional view of a second embodiment of the present systems that comprises a wellbore with a plurality of branching bores for positioning the additive compositions in a targeted manner within a geologic structure.

In some embodiments, such as the one depicted in FIG. 2, the present systems comprise branching bores 108 extending from the first wellbore 102 and into the geologic formation 104 (e.g., a plurality of branching bores 108 radiating outward from first wellbore 102, such, for example, as may be formed by directional drilling). In some embodiments of the present methods, a first fluid composition comprising a base metal is selectively injected into one or more of branching bores 108 (e.g., but not injected into others of branching bores 108). For example, the first fluid composition may be provided into branching bore 108' followed by selectively providing the second fluid composition comprising an activating additive into the branching bore 108'. In some embodiments, a portion of the wellbore 102 may be targeted and/or sealed with a suitable plug or sliding mechanism (e.g. sliding sleeve) 110 such that portions of the subterranean volume are selectively restricted and allowed to pressurize while the base metal particles are consumed, thereby focusing and/or maximizing pressure gradient resulting from generation of the gaseous product. As depicted in FIG. 1, branching bore 108' is selectively restricted such that generation of gaseous product occurs in a restricted volume, thereby maximizing the pressure gradient and associated fractures 106'. It may be appreciated that in restricted volumes, the corrosion process will typically continue until the partial pressure of gaseous hydrogen product drives the equilibrium potential of eq. 2 to a value equivalent to the equilibrium potential of eq. 1, at which point the corrosion process will cease. In some embodiments, hydrogen gas buildup in a restricted volume of branching bore 108' may effectively arrest the corrosion reaction.

In some embodiments, additives (e.g., activating additives) may be selectively positioned in a targeted, localized manner within the wellbore, within a branching bore, within a natural subterranean discontinuity (fissures, pores, fractures, joint, faults), proximal to natural deposits of ore (vein, seam pockets), proximal to natural deposits of minerals, or combinations thereof; thereby maximizing local pressure gradients within the geologic formation.

Figure 3:
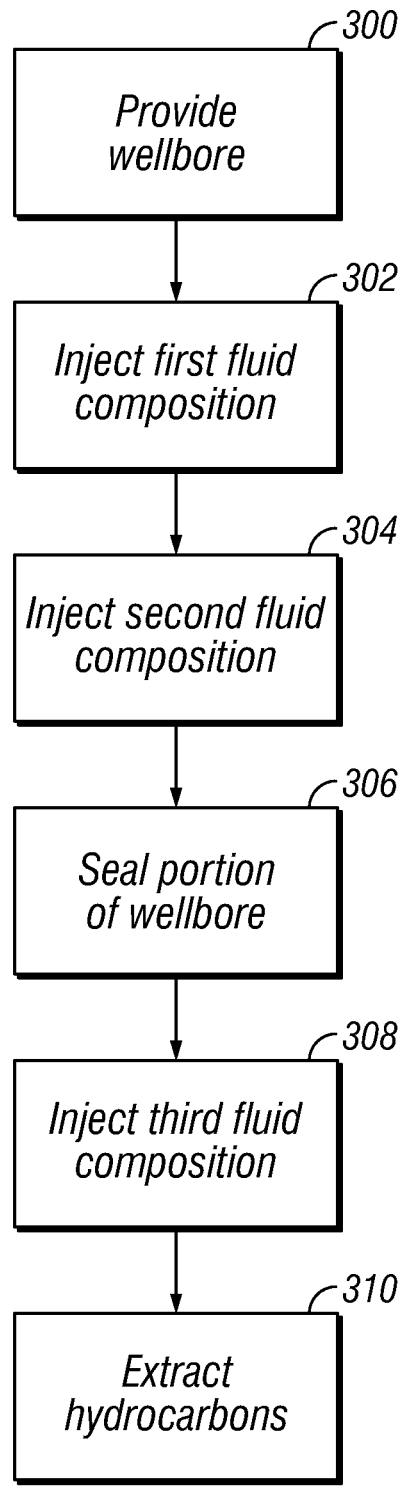
FIG. 3 illustrates a flow chart of an example of the present methods for facilitating hydrocarbon extraction.

For example, as depicted in FIG. 2 and conceptually illustrated by the flow chart of FIG. 3, in some embodiments of the present methods, a first wellbore 202 may be provided during first step 300. In some embodiments, one or more branching bores 204a, 204b emanating from the first wellbore 202 may be provided. Additionally, branching bores 206a-c may emanate from other branching bores 204a-b. Any system of branching bores may be implemented and/or utilized that permits the delivery of fluids and/or removal of hydrocarbons through wellbore 202.

At step 302, a first fluid composition may be injected into wellbore 202 such that the base metal slurry is positioned within wellbore 202, one or more of branching bores 204a, 204b, and/or one or more of branching bores 206a, 206b, 206c. For example, in some embodiments, the first fluid composition can be injected in a targeted and/or localized manner. For example, in the example illustrated in FIG. 2, a first fluid composition may be positioned in branching bore 206a (but not in branching bores 204b, 206b, or 206c) with the aid of sliding plugs 210a and 210b (which are positioned to substantially block communication between wellbore 202 and branching bores 204b, 206b, and 206c, as shown). In step 304, the second fluid composition (comprising an activating additive) may be injected into the wellbore in a localized manner similarly to step 302. In some embodiments, branching bore 206a may be further sealed with the use of an additional plug or sliding mechanism (not depicted) to further limit the reaction volume at step 306. Upon physical contact of the base metal of the first fluid composition and the activating agent of the second fluid, a gaseous product is generated which increases the subterranean pressure, thereby inducing fractures 208 within the geologic structure. In some embodiments, a third fluid composition comprising a deactivating additive is provided in the wellbore 202 so as to effectively arrest the corrosion process at step 308. Finally, well fractures 208 resulting from induced pressure gradients as a result of electrochemical reactions of the base metal facilitate extraction of hydrocarbons at step 310.

In some embodiments, the present methods and materials may be employed at various intervals and magnitudes throughout the lifetime of a well to provide extraction (e.g., consistent and/or efficient extraction) of hydrocarbons on an extended basis (over an extended period of time, such as, for example, a period of several years). As the well matures, the rate of hydrocarbon extraction may diminish due to any number of mechanisms. For example, high concentrations of subterranean water may be produced upon fracturing events and/or develop over time. For example, produced water and/or other obstructing agents generally depicted at 220 may fill the voids of porous rock and/or fractures via capillary motion, wicking, pooling, flooding or otherwise, thereby impeding egress of hydrocarbons out of the wellbore. Not to be bound by any particular theory or mechanism, but water trapped in capillary-scale pores may limit the rate of hydrocarbon extraction from tight rock or rock with small pores. It should be appreciated that at least some embodiments of the present methods consume produced, input, or connate water (eq. 2), thereby transforming an impediment to hydrocarbon egress to an accelerator of hydrocarbon egress.

In some embodiments, the corrosion rate may be modulated such that the product gas of the corrosion reaction essentially unblocks subterranean discontinuities, voids, pores, fissures, fractures, joints, faults and/or branching bores of impediment water and/or other obstructing agents, thereby facilitating hydrocarbon extraction over a short term and/or over a longer, sustained period of time. It may be appreciated that at least some of the present systems and methods provide local, sustained pressure sources to keep channels for hydrocarbon egress open, thereby facilitating extraction. In various ones of the present embodiments, the rate of corrosion and hence the rate of product gas production may be adjusted by varying one or more of: base metal surface area, concentration of activating additive, concentration of deactivating additive, or a combination thereof. For example, a high surface area or activating agent:base metal ratio may be provided to fracture a portion of the wellbore. Subsequently, a lower surface area base metal and/or lower activating agent:base metal ratio may be employed as the production rate drops to clear or reduce impediments to hydrocarbon flow.

In the embodiment illustrated in FIG. 2, after an initial fracturing process produces fractures 208, production from hydrocarbon resource 200 results in connate water 220 migrating out of resource 200, filling pores and/or fractures, and thereby slowing the rate of production. It may be appreciated that the overall production may be reflected in the aggregate slowing of the manifold of porous emitters of methane gas, and as such, minuscule quantities of water filling the pores may have a massively negative impact on production rate. In some embodiments, resource 200 is populated with (e.g., by pumping in slurry form) corroding particles 222 (e.g., as described above for the base metal) which consume capillary water and prevent this source of decline.

In some embodiments, the base metal particles are essentially provided as local, sustained pressure sources such that product gas builds pressure in a localized area as opposed to other embodiments in which a majority of a hydrocarbon-rich formation is pressurized. Subterranean pressures can be sustained for long periods of time (e.g. over 24 hours for a single 100 um particle corroding at 1 $mA/cm^2$). It may be appreciated that sustained, localized pressure sources may facilitate the propagation of cracks and fractures, the generation of pores (wherein product gas is forced through existing weaknesses connecting larger fissures), the definition of fracturing zones as opposed to conventional hydraulic fracturing which is characterized as a "bulk" process. As such, embodiments of the present systems and methods can be implemented to exploit structural weaknesses within a hydrocarbon-rich formation.

It may be appreciated that, in at least some of the present embodiments, the geologic structure comprising hydrocarbons is not fractured by compression of fluid across kilometers of pipe and porous rock in the conventional hydraulic fracturing method. Instead, the embodiments of the present methods and systems can be implemented to target and isolate particular zones for fracturing through application of the appropriate conditions for efficient hydrocarbon extraction.

It may be further appreciated that conventional hydraulic fracturing typically involves vast quantities of water, such as, for example, on the order of millions of gallons. These massive quantities are required to build pressure across large volumes of rock. In contrast, some embodiments of the present methods minimize, relative to conventional hydraulic fracturing, the fluid mass and hydraulic pressure required. For example, only the filling volume of the particular target bore section and/or branching bore may be provided to initiate the corrosion process and resultant fracturing. For example, a 15 inch diameter wellbore translates to approximately 23 gallons per meter of bore length. Even a wellbore length of 10 kilometers will be significantly less than millions of gallons.

The present methods may be configured to be implemented over an initial extraction period of a wellbore, and/or may be configured to operate over the lifetime of the wellbore, such that the present methods are not limited to any particular interval in the operational trajectory of a wellbore.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments. For example, embodiments of the present methods and systems may be practiced and/or implemented using different structural configurations, materials, ionically conductive media, monitoring methods, and/or control methods.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A method to facilitate extraction of subterranean hydrocarbons from a geologic structure, the method comprising:
    injecting a first fluid composition comprising a base metal and proppant particles into a first wellbore that extends into the geologic structure, the base metal particles having a first density and the proppant particles having a second density, wherein a ratio of the second density to the first density is equal to or less than 5;
    wherein corrosion of the base metal in the wellbore results in electrochemical oxidation of the base metal and electrochemical reduction of a reducible species that generates a gaseous product in sufficient quantities to increase the subterranean pressure in at least a portion of the wellbore and thereby induce fractures within the geologic structure; and
    at least some of the induced fractures are kept open by the proppant particles thereby facilitating egress of hydrocarbons from the geologic structure.

2. The method of claim 1, wherein a ratio of the second density to the first density is equal to or less than 2.

3. The method of claim 1, wherein a ratio of the second density to the first density is equal to or less than 1.02.

4. The method of claim 1, wherein the base metal comprises one or more of: aluminum, magnesium, sodium, calcium, zinc, indium, lead, manganese, chromium, iron, cadmium, cobalt, nickel, tin, lead, boron, silicon, and combinations thereof.

5. The method of claim 1, wherein the first fluid composition further comprises a surface passivating additive.

6. The method of claim 5, wherein the surface passivating additive includes one or more of: a sulfate, a phosphate, a nitrite, a chromate, a phosphonate, and a molybdate.

7. The method of claim 1, wherein the reducible species comprises water and the gaseous product comprises hydrogen gas.

8. The method of claim 1, further comprising:
    injecting a third fluid composition comprising a deactivating additive into a wellbore;
    wherein the deactivating additive deactivates the corrosion process such that the rate of electrochemical oxidation of the base metal and electrochemical reduction of a reducible species is decreased.

9. The method of claim 8, wherein the deactivating additive comprises one or more of: a water, an acid, an acid precursor, a base, a base precursor, an anion, an amine, an amine ester, an organoamine, a nitrite, a borate, a phosphate, a phosphate ester, a dispersant, and any combination thereof.

10. The method of claim 1, further comprising:
    substantially sealing a portion of the wellbore after injection of the second fluid composition to restrict the sealed portion of the subterranean volume and thereby maximize a pressure gradient resulting from generation of the gaseous product.

11. A method to facilitate extraction of subterranean hydrocarbons from a geologic structure by sequentially injecting alternate stages of fracturing fluid compositions from a wellhead into a wellbore, the method comprising:
    injecting a first fluid composition comprising base metal particles into the wellbore for a first predetermined time period; and
    injecting a second fluid composition comprising an activating additive into the wellbore for a second predetermined time period; and injecting fluids comprising proppants that differ in at least one of: density, size, concentration, and a combination thereof;

wherein the first fluid and second fluid are injected in sequence such that the activating additive activates a corrosion process at a distance from the wellhead, resulting in electrochemical oxidation of the base metal and electrochemical reduction of a reducible species to generate a gaseous product and a metal oxide product.

12. The method of claim 11, further comprising:

injecting a third fluid composition comprising a deactivating additive for a third predetermined time period, wherein the deactivating additive deactivates the corrosion process.

13. The method of claim 11, wherein the base metal particles are encapsulated by an encapsulating material, and the second fluid composition comprises an activating additive that dissolves the encapsulating material.

14. The method of claim 13, wherein the base metal particles are encapsulated by a surfactant, polymer, sulfate, carboxylate, ester, other less reactive metals, other metals that react at a different pH or in response to other stimuli, or a combinations thereof.

15. The method of claim 11, wherein the base metal corrodes in the wellbore at a rate that is low enough to produce a gaseous product that provides local sustained pressure substantially without inducing fractures in the geologic structures.

16. The method of claim 11, wherein the activating additive comprises one or more of: an acid, an acid precursor, a halide ion, and a combination thereof.

17. A method to facilitate extraction of subterranean hydrocarbons from a geologic structure by sequentially injecting alternate stages of fracturing fluid compositions from a wellhead into a wellbore, the method comprising:

injecting a first fluid composition comprising base metal particles into the wellbore for a first predetermined time period; and injecting a second fluid composition comprising an activating additive into the wellbore for a second predetermined time period; and alternating injection of fluids with proppant and fluids without proppant;

wherein the first fluid and second fluid are injected in sequence such that the activating additive activates a corrosion process at a distance from the wellhead, resulting in electrochemical oxidation of the base metal and electrochemical reduction of a reducible species to generate a gaseous product and a metal oxide product.

\* \* \* \* \*